Figure 2:
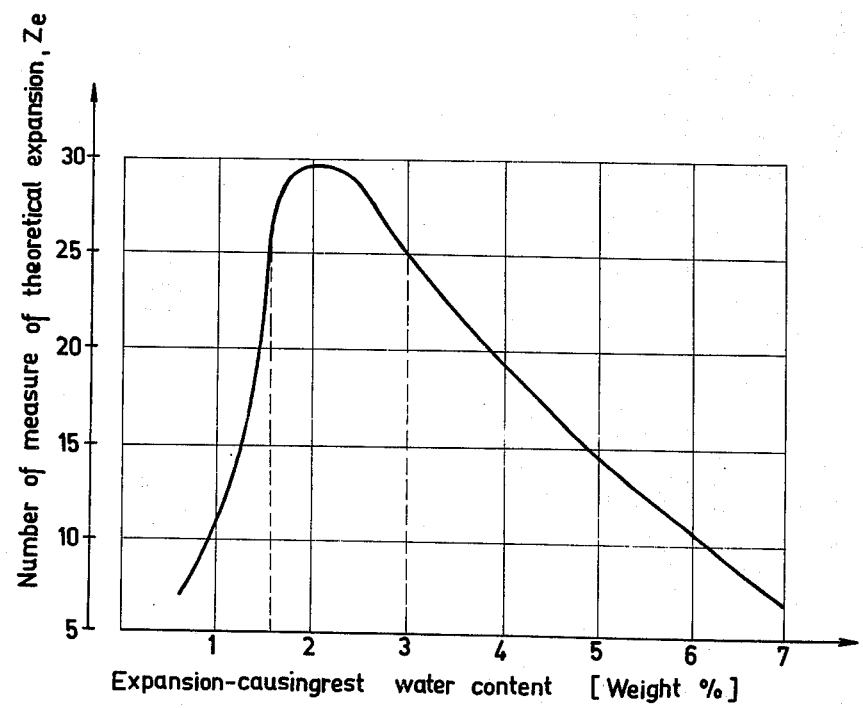

United States Patent [19]
Toth et al.

[11] 3,986,883
[45] Oct. 19, 1976

[54] EXPANDED RIOLITE GLASSES AND A PROCESS FOR THE PREPARATION THEREOF

[75] Inventors: Kálmán Toth; Gyula Varju, both of Budapest, Hungary

[73] Assignee: Szilikatipari Kozponti Kutato es Tervezo Intezet, Budapest, Hungary

[22] Filed: Nov. 13, 1974

[21] Appl. No.: 523,261

[30] Foreign Application Priority Data
Nov. 19, 1973  Hungary .................................. SI1356

[52] U.S. Cl. ............................ 106/40 V; 106/DIG. 2
[51] Int. Cl.² ........................................... C03B 00/00
[58] Field of Search ................. 106/40 V, 40 R, 51, 106/DIG. 2

[56] References Cited
UNITED STATES PATENTS

| | | | |
|---|---|---|---|
| 2,021,956 | 11/1935 | Gladney | 106/40 V X |
| 2,243,027 | 5/1941 | Baker | 106/40 V |
| 2,902,379 | 9/1959 | McCollum | 106/DIG. 2 |

OTHER PUBLICATIONS

Hackh's Chemical Dictionary–4th Ed.–pub. NYC, McGraw Hill 1969–pp. 719–720.
Lacy, E. D.–"The hydration and dehydration of aluminosilicate glasses"–Chem. Abstracts vol. 68 (1968) pp. 578–579.

*Primary Examiner*—Helen M. McCarthy

[57] ABSTRACT

The invention relates to expanded products made from riolite glasses with a natural water content of at least 4 % by weight, as well as to a process for the preparation of such products. When preparing these expanded products a granulometric fraction of 0.3 to 3.0 mm. of the natural riolite glass is subjected to a heat treatment at 220° to 400° C for at least one hour, to reach a residual water content of 1 to 4 % by weight, and the obtained partially dehydrated substance is expanded at 800° to 1300° C. This way expanded products with high quality can be obtained.

4 Claims, 2 Drawing Figures

EXPANDED RIOLITE GLASSES AND A PROCESS FOR THE PREPARATION THEREOF

This invention relates to a process for the preparation of expanded products from riolite glasses (such as tuff, pumice, pumicite, pumice-tuff, pitchstone, etc.) containing in natural state at least 4 % by weight of water in colloidal-disperse state. The invention relates further to the expanded products made from these raw materials.

Of the porous, lightweight additives primarily used in the production of sound- and heat-insulating materials expanded perlite is the most widespread. Natural perlite is a volcanic glass with a water content of 3 to 4 % by weight, which undergoes a characteristic expansion to the multiple of its original volume when heated rapidly (within 1 to 30 seconds) to a temperature between 850° and 1250° C. This phenomenon is caused by a part of the steam liberated upon heating, which is unable to leave the pyroplastic, high-viscosity melt, and thus causes a great increase in volume. On this basis a material of great porosity and low bulk density can be prepared. Expanded perlite is extensively utilized in the industry and agriculture as an additive of cellular concrete and as a porosity-ensuring component of heat-insulating materials admixed with various binding agents.

The occurrence of natural perlite is relatively rare and the deposits are generally very heterogeneous. The latter fact makes perlite very difficult to mine, which causes extra expenses. Perlite can be obtained from its natural sources by only a very selective mining procedure, involving the extraction of a considerable amount of dead rock. The natural perlite capable of providing a high quality expanded product is very rare, and only a low, insufficient amount of such high quality products can be prepared from the mined natural perlite.

A further disadvantageous property of natural perlite is the breaking up on expansion of the particles. Namely, the original grains of the rock burst into several secondary grains upon expansion, and thus the yield of the more valuable, coarse-grained expanded product is relatively low, remaining generally below 50 % (Poliukovskaya, Sergeieff, Chernova: Vspitsensy penlit Zapolnitely logky betonof, Moscow, 1971). The relatively high costs of expanded perlite impede its extensive use in the agriculture and building industry.

This invention aims at the substitution of natural perlite with other rocks of volcanic origin, which are considerably different from perlite and do not suffer from the disadvantages of perlite; i.e. occur in great amounts and in homogeneous quality, have favourable natural grain structures, are easy to convert into expanded products, require less or even no grinding, are less liable to breaking up and thus provide a higher yield of coarse-grained fraction, and are, finally, less expensive than perlite.

It has been found that riolite glasses, such as tuff, pumice, pumicite, pumice tuff, pitchstone, etc., satisfy well these requirements. Of these riolite glasses certain natural pumicite rocks occurring at genetically and volcanologically well-defined places (such as in the Tokaj-mountain, Hungary) proved to be outstandingly suitable. These loose, friable rocks, which can be extracted directly with a simple dredger or a bucket excavator, contain the desired granulometric fraction of 0.3 to 3.0 mm. in an amount of 30 to 50 % by weight even in natural state, and this fraction can be separated from the other fractions by a simple dry screening.

It has been found, however, that the riolite glasses which contain colloidally bound water in an amount higher than 4 % by weight in the natural state, such as tuffs (pumicite contains e.g. 6 to 7 % by weight of water) cannot be expanded at all under the conditions applicable for perlite, or they are expanded at an inadequately low rate, not enabling the production of industrially applicable products with low bulk density. This phenomenon can be attributed to the fact that the relatively high amount of bound water loosens the rock during the rapid heat-treatment, a coarse pore system is formed, and the "effective water", present even in the pyroplastic state, escapes from the material through these coarse pores without exerting any swelling effect.

By dehydration experiments on riolite glasses we have found, however, that the rock can be converted into a hydrate state which enables the rock to be expanded by a specific dehydration process, by a heat treatment for a given time at a specified temperature. By expanding riolite glasses subjected previously to this specific heat treatment, expanded products of excellent quality can be obtained. This applies to all riolite glass containing higher amounts of natural water than the technological optimum. This class includes, for example, pumicite, tuff, pumice, pumice-tuff, pitchstone, and low quality perlite as well (i.e. perlite with a water content higher than 4 % by weight), not expandable by the hitherto known processes.

The correlation between the water content and the expandability of riolite glasses was investigated on pumicite samples with various water contents. The expandability was determined at 1000°, 1100° and 1200° C with a treatment period of 10 to 30 seconds, according to the method of Toth (Tonindustrie Zeitung No. 6, 1972; Épitöanyag No. 7, 1972). The results of these tests are summarized in Table 1 below.

Table 1

Correlation between the water content and the bulk density of pumicite at various expansion temperatures

| Water content, % | Bulk density, g./l. at an expansion temperature of | | |
|---|---|---|---|
| | 1000° C | 1100° C | 1200° C |
| 6.7 | 680 | 520 | 400 |
| 5.2 | 490 | 430 | 330 |
| 3.7 | 250 | 210 | 190 |
| 2.0 | 140 | 70 | 100 |

The above data indicate that in order to obtain acceptable expandability (i.e. to obtain a product with a favourably low bulk density) the water content of the sample must be reduced below 4 % by weight, and optimum results can be obtained with samples having a water content of about 2.0 % by weight. The same applies to riolite glasses other than pumicite.

Figure 1:
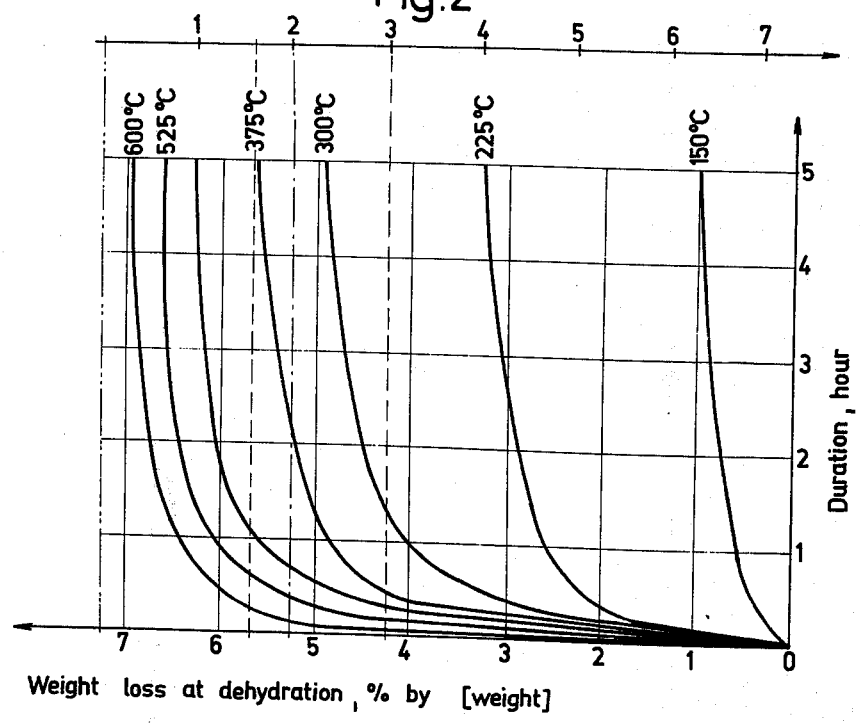

The weight loss of a pumicite sample with an initial water content of 6.6 % (for its chemical composition see Example 1) as a function of the duration of dehydration at various temperatures is shown in FIG. 1 (abscissa: weight loss at dehydration /% by weight/, ordinate: duration /hour/), whereas the correlation between the residual water content and the expandability of the pumicite samples is shown in FIG. 2 (abscissa: residual water content causing expansion /% by weight/, ordinate: theoretical expansion number $/Z_e/$). The curve shown in FIG. 2 was taken at a temperature of 1150° C with an expansion time of 10 seconds. For the determination of the theoretical expansion number ($Z_e$) see the cited Tonindustrie article.

From a comparison of FIGS. 1 and 2 it appears that the maximum expandability can be attained with samples containing about 2 % by weight of water, but the samples containing 1 to 4 % by weight, preferably 1.5 to 3 % by weight, of water also possess good expansion properties. The drying temperatures corresponding to these limits of water content range between 220° and 400° C (see FIG. 1). The same applies, within minor deviations, to other riolite glasses as well.

Accordingly, in one aspect, the invention relates to expanded products made of riolite glasses with a natural water content higher than 4 %.

Furthermore, in its second aspect, the invention relates to a process for the preparation of expanded products from riolite glasses with a natural water content of at least 4 % by weight, in which a granulometric fraction of 0.3 to 3.0 mm. of the riolite glass is subjected to a heat treatment at 220° to 400° C for at least one hour, to reach a residual water content of 1 to 4 % by weight, preferably 1.5 to 3 % by weight, and the obtained partially dehydrated substance is expanded at 800° to 1300° C.

The first heat-treatment step (i.e. the partial dehydration) is carried out preferably at a temperature from 270° to 400° C.

The term "residual water content" refers to the actual water content of the individual grains of the whole mass, and not to the average water content. For this reason the partial dehydration must be performed under carefully controlled, mild heat-exchange conditions in order to prevent the batch from overdrying. These conditions can be met e.g. by using IR tunnel driers, fuel-heated or electrically heated rolling-drum driers or other drying equipments ensuring mild drying conditions, operating at a temperature between 220° and 400° C.

As mentioned above, the first heat-treatment step (i.e. the partial dehydration) requires at least one hour. The actual duration of dehydration depends on both the initial water content of the sample and the temperature of drying; samples with higher water content require a longer heat treatment, and the duration of heat treatment is related inversely to the temperature of drying.

The dried, partially dehydrated substance is thereafter expanded according to the usual procedures. Expansion is performed at temperatures of 800° to 1300° C for 1 to 30 seconds in usual equipments, e.g. in fixed or rotating kilns.

The main advantages of the invention are as follows:

a. The raw materials, unlike perlite, occur in great amounts and in homogeneous quality, and can be extracted by even the simplest mining procedures. In other words, riolite glasses are the most easily available and the most economical raw material bases of the production of expanded grain products. The introduction of riolite glasses into the production of expanded grain products extends the resources of "perlite type" minerals to several billions of tons.

b. Since the natural riolite tuffs contain the desired granulometric fraction (grains with a diameter of 0.3 to 3.0 mm.) already in an amount of 30 to 50 %, and the larger grains can be ground very easily, the pre-treatment of the minerals is very simple.

c. The specific weight, strength and porosity of expanded riolite glasses are the same as those of expanded perlite with the same bulk density. Owing to the coarser grain structure of riolite glasses in comparison with perlite and their much weaker tendency to breakening at expansion, they allow to prepare the industrially valuable coarse fraction with far better yields than perlite. Thus a more valuable product can be prepared from a less expensive raw material.

The invention is elucidated by the aid of the following non-limiting Examples.

EXAMPLE 1

Naturally occurring pumicite mined at Bodrogszeg (Hungary), having the analytical composition of

| | |
|---|---|
| $H_2O$ (weight loss at ignition) | 6.63 % |
| $SiO_2$ | 72.57 % |
| $Al_2O_3$ | 11.90 % |
| $Fe_2O_3$ | 0.79 % |
| $TiO_2$ | 0.10 % |
| FeO | 0.39 % |
| MnO | 0.13 % |
| CaO | 1.08 % |
| MgO | 0.32 % |
| $Na_2O$ | 1.21 % |
| $K_2O$ | 4.84 % |
| $SO_3$ | 0.10 % | is used as starting material. (The above data refer to a sample dried to constant weight at 105° C).

According to X-ray analysis the starting substance is amorphous.

The granulometric distribution of the naturally occurring rock is as follows:

| | |
|---|---|
| below 0.5 mm. | 54.4 % |
| 0.5 to 3.0 mm. | 24.6 % |
| 3.0 to 5.0 mm. | 5.1 % |
| 5.0 to 7.0 mm. | 4.4 % |
| 7.0 to 10.0 mm. | 3.4 % |
| 10.0 to 15.0 mm. | 2.5 % |
| above 15.0 mm. | 5.6 % |

The granulometric fraction of 0.3 to 3.0 mm. is separated from the mined rock by dry screening. The obtained sample is dried at 375° C for 1.5 hours in a rotating-drum dryer to obtain a partially dehydrated product with a residual water content of 2 %. The obtained product is cooled, and finally expanded in a horizontal rotating kiln at 1150° C for 10 seconds. An expanded product with the following characteristics is obtained:

bulk density: 100 g./liter
granulometric distribution: $d$ below 0.5 mm. — 10 %; $d$ above 0.5 mm. — 90 % measure of breaking up of particles (determined by the method of Toth, Ionindustrie Zeitung No. 6, 1972): $A_1 = 34.7$ strength (determined by the modified Brouch method, J. of the American Concrete Institute 859–860 /1954/): 4.16 kg./cm².

EXAMPLE 2

Naturally occurring pumicite, mined at Tarcal (Hungary), with a similar analytical composition as given in Example 1, is used as starting substance.

The granulometric fraction of 0.3 to 3.0 mm. is separated from the mined rock by dry screening. The obtained sample is dried at 375° C for 1.5 hours in an IR tunnel dryer to obtain a partially dehydrated product with a residual water content of 2 %. The obtained product is transferred into a fluidized-bed kiln and expanded at 1150° C for 10 seconds. An expanded product with the following characteristics is obtained:
bulk density: 70 g./liter
granulometric distribution: $d$ below 0.5 mm. — 5 % $d$ above 0.5 mm. — 95 %
measure of breaking up of particles (determined by the method of Toth,
Tonindustrie Zeitung No. 6, 1972): $A_1 = 24.6$ strength (determined by the modified Brouck method, J. of the American Concrete Institute 859–860 /1954/): 3.45 kg./cm².

What we claim is:

1. A process for the preparation of expanded products from amorphous riolite glasses with a natural water content of at least 4 % by weight, in which a granulometric fraction of 0.3 to 3.0 mm. of the riolite glass is subjected to a heat treatment at 220° to 400° C for at least one hour, to partially dehydrate the glass to a residual water content of from 1 to 4 % by weight and the obtained partially dehydrated substance is expanded at 800° to 1300° C during a time period of from 1 to 30 seconds at 800° to 1300° C, wherein said residual water content is such that the bulk density of the expanded end product is about 250 gram/liter or less.

2. A process as claimed in claim 1, in which the partial dehydration is carried out at a temperature between 270 and 400° C.

3. A process as claimed in claim 1, in which a partially dehydrated product with a residual water content of 1.5 to 3 % by weight is prepared in the heat treatment step.

4. A process as claimed in claim 1, wherein the partially dehydrated substance is expanded during a time period of from 1 to 10 seconds.

* * * * *